United States Patent [19]

Uchiyama et al.

[11] 4,398,984

[45] Aug. 16, 1983

[54] METHOD OF PRODUCING ARTICLE HAVING SECONDARY PART ADHERED TO PRESS-FORMED METAL PART

[75] Inventors: Toshihiko Uchiyama, Yokohama; Eizo Yoshida, Chigasaki; Toshiki Okuyama, Oiso, all of Japan

[73] Assignee: Nissan Motor Co., Ltd., Yokohama, Japan

[21] Appl. No.: 272,374

[22] Filed: Jun. 10, 1981

[30] Foreign Application Priority Data

Jun. 12, 1980 [JP] Japan .................................. 55-78316

[51] Int. Cl.³ ............................ B31F 1/00; C09J 5/04
[52] U.S. Cl. .................................... 156/196; 29/469.5; 72/42; 72/46; 72/379; 156/245; 156/281; 156/310; 156/315; 156/316; 156/307.5; 156/331.2; 156/331.4; 296/191; 428/174; 428/461
[58] Field of Search ............... 156/196, 245, 281, 310, 156/315, 316, 307.5, 331.2, 331.4; 428/174, 461; 29/469.5; 72/46, 42, 379; 252/56 R; 427/409; 296/191

[56] References Cited

U.S. PATENT DOCUMENTS

| | | | |
|---|---|---|---|
| B 452,034 | 3/1976 | Thomas | 296/137 |
| 2,952,294 | 9/1960 | Beverley et al. | 72/42 |
| 3,568,486 | 3/1971 | Rosenberg et al. | 72/42 |
| 3,696,498 | 10/1972 | Leontaritis et al. | 72/42 |
| 3,847,828 | 11/1974 | Latos | 252/56 R |
| 4,092,202 | 5/1978 | Bergk et al. | 156/331.7 |
| 4,169,006 | 9/1979 | Matsubara et al. | 156/315 |

OTHER PUBLICATIONS

"Improved Metal Bonding with Silanes," *Manufacturing Technology Note*, Report No.: ARLCD-TR-78042, Jul. 1980.
European Search Report.

*Primary Examiner*—John J. Gallagher
*Attorney, Agent, or Firm*—Schwartz, Jeffery, Schwaab, Mack, Blumenthal & Koch

[57] ABSTRACT

In producing an article having a structurally primary part obtained by press-forming of a metal sheet to which a lubricant is applied beforehand and a secondary part stuck to the primary part with an adhesive, troublesome procedures for removal of the lubricant from the press-formed metal part precedent to adhesion-bonding of the secondary part can entirely be omitted without sacrificing the strength of adhesion between the primary and secondary parts by using an adhesive that has high chemical affinity with the lubricant remaining on the surface of the press-formed metal part. Preferably use is made of a solid lubricant containing organic polymeric substance as its principal component. In many cases the secondary part is made of a nonmetallic material, either an organic material or an inorganic material.

11 Claims, 3 Drawing Figures

U.S. Patent  Aug. 16, 1983  4,398,984
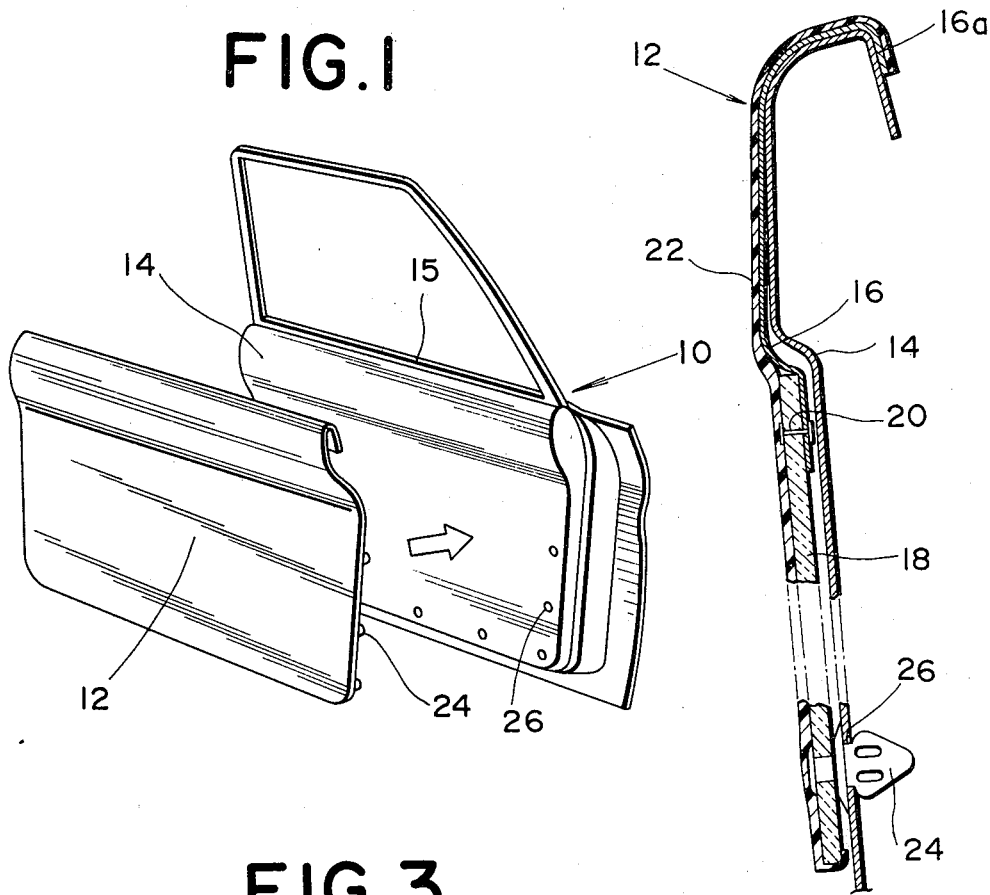
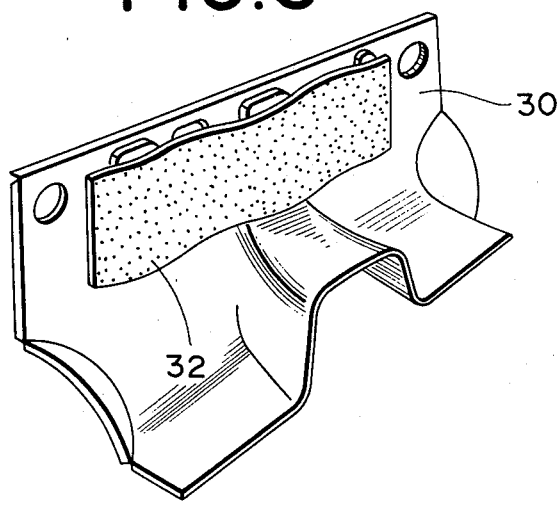

METHOD OF PRODUCING ARTICLE HAVING SECONDARY PART ADHERED TO PRESS-FORMED METAL PART

BACKGROUND OF THE INVENTION

This invention relates to a method of producing an article having a structurally primary part obtained by press-forming of a metal sheet and a structurally secondary part which is stuck to the primary part with an adhesive. For example, the article may be a vehicle body part wherein the secondary part is provided for decorative or cushioning purpose.

Various articles, or some parts thereof, are produced through the steps of forming a structurally primary part by press-forming of a metal sheet and sticking a structurally secondary part which serves, for example, a decorative or cushioning purpose to the primary part by using an adhesive. In automobiles for instance, door trim panels are largely produced through such steps, using a sheet of a relatively soft and elastic material such as textile, nonwoven fabric or synthetic resin processed into artificial leather as the aforementioned secondary part.

Considering more in detail, press-forming of the primary part is accomplished through the following sub-steps: (a) blanking of metal sheet, (b) application of lubricating oil to the blank, (c) press-forming, (d) degreasing for removal of the lubricating oil from the press-formed metal part, (e) cleansing of the degreased metal part, (f) drying of the cleansed metal part, and (g) disposal of the chemicals used in the degreasing step and washings in the cleansing step. In a practical press-forming operation for sheet metal, it is an indispensable requisite to use a lubricant for accomplishment of smooth operation and production of a defectless metal part. Naturally the lubricant remains on the surfaces of the press-formed metal part.

It has commonly been recognized that adhesion-bonding of a secondary part to the press-formed metal part must be preceded by complete removal of the lubricant from the metal part because the presence of the lubricant between the metal part surface and an adhesive layer for sticking of the secondary part constitutes a serious obstacle to the establishment of strong adhesion between the secondary part and the primary metal part. It is impossible or impracticable to achieve complete removal of the lubricant merely by a physical cleaning method, and therefore the aforementioned degreasing step is performed by chemical treatment of the press-formed metal part. Then it becomes necessary to completely cleanse the chemicals used for degreasing from the degreased metal part because the presence of such chemicals is also detrimental to the subsequent adhesion operation. The cleansed metal part must be dried, and the waste lubricant and degreasing agent as well as the washings in the cleansing step must be disposed through suitable treatments. These sub-steps (d), (e), (f) and (g), though can be regarded as subsidiary steps, are considerably troublesome operations and constitute significant factors of the total production cost.

SUMMARY OF THE INVENTION

It is an object of the present invention to provide an improved method of producing an article of the above described category through press-forming of the primary metal part and adhesion-bonding of the secondary part to the primary part, which method does not require any degreasing or cleansing procedure precedent to the application of an adhesive to the press-formed metal part.

A method according to the invention for the production of an article having a structurally primary part formed of a metal sheet and a structurally secondary part stuck to the primary part comprises the steps of forming the primary part by press-forming of a metal sheet to which a lubricant is applied beforehand, applying an adhesive of which the principal component has high chemical affinity with a principal component of the lubricant to a surface of the primary part with the lubricant retained thereon, and sticking the secondary part to the adhesive-applied surface of the primary part.

The invention is based on our discovery, and experimental confirmation, that sufficiently strong adhesion can be established between the primary and secondary parts without the need of removing the lubricant from the press-formed primary part by selecting a suitable combination of the lubricant and adhesive such that the principal component of the adhesive has high chemical affinity with the principal component of the lubricant. In other words, the adhesive is selected such that the lubricant retained on the surface of the press-formed metal part can be well wetted with the adhesive applied in liquid state to the metal part surface.

As the industrially important advantage of the method according to the invention, the production of the intended article can be completed by completely omitting the above described troublesome sub-steps (d)–(g) for degreasing and cleansing the press-formed part, with considerable reduction of the production cost.

A preferable example of the lubricant for use in this method is a solid lubricant containing an organic polymeric substance preferably polyacrylic acid as its principal component. It is possible to commercially obtain a metal sheet already coated with a solid lubricant of this type, and by utilizing such a metal sheet the initial stage of forming the primary part can be still simplified to only the blanking and press-forming sub-steps.

The principal component of the adhesive for use in this method may be a synthetic rubber such as nitrile rubber or polyurethane rubber or a vinyl polymer.

The primary part may be formed of either steel or a nonferrous metal. Usually the secondary part is made of a nonmetallic material, either an organic material or an inorganic material, as exemplified by textile, nonwoven fabric, cardboard, corrugated paperboard, synthetic rubber and artificial leather or any other form of synthetic resin.

BRIEF DESCRIPTION OF THE DRAWING

FIG. 1 is a perspective view of an unfinished door of an automobile and a trim panel to be attached to an inner panel on the inboard side of the door;

FIG. 2 is a vertical sectional view of the trim panel of FIG. 1 in the state attached to the door inner panel; and FIG. 3 is a perspective view of a dash panel as a part of an automobile body, with a rubber sheet stuck to the panel for suppression of noise and vibration.

DESCRIPTION OF THE PREFERRED EMBODIMENTS

In the manufacture of automobiles, the method according to the invention is applicable to the production of various parts of the car body. As a typical example, FIGS. 1 and 2 show a door trim panel 12 to be produced by utilizing the method of the invention. An automobile door 10 shown in FIG. 1 has a door inner panel 14 so shaped as to provide a horizontally elongate opening 15 along the upper edge of this panel 14 or, in other words, along the waistline of the door. This trim panel 12 is of the so-called full trim type shaped so as to cover the entire area of the inboard side of the door inner panel 14.

A backing part of this trim panel 12 consists of a so-called door garnish 16, which is formed of a steel sheet and has a curved shape corresponding to the curved shape of an uppermost portion of the door inner panel 14, and a hardboard 18 which is fixed in its upper region to the lowermost portion of the door garnish 16 by rivets 20 so as to cover the nearly flat lower portion of the door inner panel 14. On the inboard side, a sheet 22 of polyvinyl chloride (PVC) resin is bonded to the door garnish 16 and the hardboard 18 by using an adhesive (not illustrated) to serve as a soft and decorative covering layer of the trim panel 12. In the side and lower marginal regions of the trim panel 12, metal clips 24 are fixed to the hardboard 18 so as to protrude towards the outboard side, and the trim panel 12 is attached to the door inner panel 14 by inserting a suitably bent upper edge portion 16a of the door garnish 16 into the aforementioned opening 15 in the door 10 and forcing the clips 24 into corresponding holes 26 of the door inner panel 14.

The following two examples relate to the production of the door trim panel 12 of FIGS. 1 and 2 by utilizing the method of the invention.

EXAMPLE 1

As the material of the door garnish 16, use was made of a cold rolled steel sheet to which a solid lubricant had been applied beforehand. The solid lubricant was Milbond MC-560 manufactured by H. A. Montgomery Co. of U.S.A. and characterized by containing polyacrylic acid. The composition of this solid lubricant is described, for example, in U.S. Pat. No. 3,568,486. The quantity of the applied solid lubricant was 3–5 g per square meter of the steel sheet. The door garnish 16 was formed through blanking of the steel sheet and press-forming of the blank. Then, the hardboard 18 cut into the predetermined shape was fixed to the door garnish 16 by rivets 20. The door garnish 16 was left as press-formed without being subjected to any degreasing or cleansing process.

For bonding of the PVC resin sheet 22 to the assembly of the door garnish 16 and the hardboard 18, use was made of Cemedine 545N which was a nitrile rubber type adhesive manufactured by Cemedine Co. of Japan. This adhesive was sufficiently high in its chemical affinity with the solid lubricant employed in the production of the door garnish 16 because of good chemical affinity of nitrile rubber with polyacrylic acid and also with acrylic acid monomer and oligomers. This adhesive was supplied in the form of a relatively low viscosity solution in organic solvent and had the following properties.

| | |
|---|---|
| Viscosity (20° C.) | 600 cp |
| Solid Component | 27.5% |
| Density (20/20° C.) | 0.85 |
| Open Time (20° C.) | 5–30 min |
| Pot Life (20° C.) | 40 min |

This adhesive was diluted by the addition of the organic solvent amounting to 20% of the adhesive and applied to the inboard-side surface of the door garnish 16 (with the solid lubricant retained thereon), and also to the surface of the hardboard 18, by means of an ordinary spray gun such that the quantity of the adhesive liquid on the door garnish 16 was 150–200 g per square meter of the steel sheet. This quantity corresponds to 36–48 g of the solid component of the adhesive per square meter of the steel sheet. After the lapse of 30 min from the application of the adhesive, the PVC resin sheet 22 was placed on the adhesive-applied surfaces of the assembly of the door garnish 16 and hardboard 18 and stuck thereto with application of a suitable pressure.

In the thus produced door trim panel 12, the PVC resin sheet 22 adhered strongly to the door garnish 16 and the hardboard 18 and long retained its good appearance without separating from the door garnish 16 even when maintained in high-temperature and/or high-humidity atmospheres, as demonstrated by the following test results.

(1) Peel Strength Test

After setting of the adhesive used in the production of the door trim panel 12 a generally U-shaped (in plan view) cut was made in the PVC resin sheet 22 in a region laid on the door garnish 16, and in a rectangular area defined by this cut line (2 cm wide and 5 cm long) the PVC resin sheet 22 was forcibly peeled off from the door garnish 16 by using a knife blade to provide a rectangular strip-like tongue, which was turned back along the uncut edge of the rectangular area.

Peel strength of adhesion between the PVC resin sheet 22 and the door garnish 16 was measured by pulling this tongue of the PVC resin sheet 22 with an increasing pull force and given by the value of the pull force at the moment of commencement of peeling of the PVC resin sheet 22 from the door garnish 16 in a region contiguous to the rectangular tongue. For every specimen of the door trim panel 12 produced in Example 1, the peel strength was greater than 4 kg. It was confirmed that the break of the adhesion occurred as so-called cohesive failure, that is, break within the adhesive layer, not at the interface between the adhesive layer and the steel sheet of the door garnish 16.

(2) High Humidity Endurance Test

Specimens of the door trim panel 12 were maintained for a period of 8 hours in a hot and humid atmosphere of 70° C., 95% RH. Thereafter, the peel strength was measured by the above described method and found to be still greater than 4 kg.

(3) Thermal Stress Test

Specimens of the door trim panel 12 were heated at 80° C. for 4 hours and then cooled at 0° C. for 2 hours, and this cycle was repeated once more. Thereafter, the peel strength was measured by the above described method and found to be greater than 4 kg.

EXAMPLE 2

The door garnish 16 was formed in accordance with Example 1 and was left as press-formed without being subjected to any degreasing or cleansing process.

As the adhesive for bonding of the PVC resin sheet 22 to the door garnish 16, use was made of a mixture of 100 parts by weight of Cemedine 700, which was a polyurethane type adhesive in the form of solution in organic solvent manufactured by Cemedine Co. of Japan, and 5 parts by weight of Desmodur L which was a polyfunctional diisocyanate in the form of solution in organic solvent provided by Farbenfabriken Bayer A.G. of West Germany. The polyurethane rubber as the principal constitutent of Cemedine 700 has OH—groups as end groups, so that a combination of Cemedine 700 and Desmodur L gives a two-part type adhesive which can undergo cross-linking at room temperature to give a tough and elastic film. Main properties of Cemedine 700 were as follows.

| Viscosity (30° C.) | 1000 cp |
|---|---|
| Solid component | 20% |
| Density (20/20° C.) | 0.92 |
| Pot Life (20° C.) | 2 days |

The pot life of the mixture of Cemedine 700 and Desmodur L was also as long as about 2 days at room temperature. This mixture was high in its chemical affinity with the solid lubricant retained on the door garnish 16 because of good chemical affinity or reactivity of the polyurethane rubber contained in Cemedine 700 with acrylic acid and its polymers.

The adhesive mixture was applied to the surface of the door garnish 16 (with the solid lubricant retained thereon), and after the lapse of 40 min the PVC resin sheet 22 was placed on the adhesive-applied surface of the door garnish 16 and stuck thereto with application of a pressure of 2.5 kg/cm² for a period of 15 seconds.

After setting of the adhesive, the strength of adhesion between the PVC resin sheet 22 and the door garnish 16 was measured by the peel test method described in Example 1. For every specimen, the peel strength value was greater than 4 kg, and the manner of break of the adhesion was cohesive failure.

For specimens subjected to the above described high humidity endurance test, the peel strength was lower than 2 kg. Also for specimens subjected to the above described thermal stress test, the peel strength was lower than 2 kg.

EXPERIMENT

Using specimens of the door garnish 16 produced in accordance with Example 1, bonding of the PVC resin sheet 12 to the press-formed steel sheet 16 (with the solid lubricant retained thereon) was performed generally in accordance with Example 1 but by varying the quantity of the adhesive (Cemedine 545N diluted by the addition of 20% solvent) to 150–200 g/m² (same as in Example 1), 100–150 g/m² and 50–100 g/m². For comparison, analogous samples were prepared without using the solid lubricant to allow direct contact of the adhesive with the uncoated steel sheet surface.

These samples were divided into five groups, which were subjected to the following tests, respectively.

(1) Initial Peel Strength Test

After the lapse of 2 minutes from the completion of bonding of the PVC resin sheet to the steel sheet, the peel strength was measured at room temperature by the method described in Example 1. The rate of pulling was constantly 200 mm/min.

(2) Peel Strength Test after Curing

The samples were left in the atmosphere at room temperature for 3 days to complete curing of the adhesive layer between the PVC resin sheet and the steel sheet, and thereafter the peel strength was measured at room temperature by the above described method.

(3) Heat Resistance Test after Curing

The samples were left in the atmosphere at room temperature for 3 days. Thereafter, each sample was placed in an oven maintained at 80° C., and a weight of 450 g was hung on the PVC resin sheet to measure the shear strength of the adhesion in terms of the length of time the weight took to fall by a vertical distance of 75 mm.

(4) Peel Strength Test after Thermal Stress

The samples were left in the atmosphere at room temperature for 3 days. Thereafter, each sample was subjected to a thermal stress test consisting of four cycles of heating at 80° C. for 4 hr and cooling at −30° C. for 1.5 hr. After that, the peel strength was measured at room temperature by the above described method.

(5) Heat Resistance Test after Thermal Stress

The samples were left in the atmosphere at room temperature for 3 days, then subjected to the above described thermal stress test and finally subjected to the above described heat resistance test to measure the shear strength.

The results of these tests are summarized in the following Table, clearly demonstrating that the presence of the solid lubricant on the steel sheet surface exerted practically no influence on the strength of adhesion between the PVC resin sheet and the steel sheet. Also it is demonstrated that the adhesion strength depended on the quantity of the adhesive per unit area.

The door trim panel 12 was produced by the same method and materials as in the preparation of the experimental samples and subjected to the thermal stress test (80° C. and −30° C.), and it was confirmed that the trim panel 12 passed this test without occurrence of peeling or floating of the PVC resin sheet 22.

| Quantity of Adhesive (g/m²) | Solid Lubricant | Initial Peel Strength (kg/25 mm) | After 3-day Curing | | After Thermal Stress | |
|---|---|---|---|---|---|---|
| | | | Peel Strength (kg/25 mm) | Heat Resistance (min) | Peel Strength (kg/25 mm) | Heat Resistance (min) |
| 150–200 | not applied | 1.5–2.7 | 2.8–3.6 | ca. 10 | 1.0–1.7 | 1–4 |
| 150–200 | applied | 1.6–2.5 | 3.0–3.5 | ca. 10 | 1.0–1.6 | 1–4 |
| 100–150 | not applied | 1.1–2.1 | 1.7–2.5 | 8–10 | 0.6–1.0 | 0–2 |
| 100–150 | applied | 1.1–2.5 | 2.0–2.8 | 8–10 | 0.6–0.7 | 0–2 |
| 50–100 | not applied | 0.9–1.5 | 1.2–2.0 | 4–6 | 0.3–0.5 | 0 |

-continued

| Quantity of Adhesive $(g/m^2)$ | Solid Lubricant | Initial Peel Strength (kg/25 mm) | After 3-day Curing | | After Thermal Stress | |
|---|---|---|---|---|---|---|
| | | | Peel Strength (kg/25 mm) | Heat Resistance (min) | Peel Strength (kg/25 mm) | Heat Resistance (min) |
| 50–100 | applied | 1.0–1.4 | 1.3–1.7 | 4–6 | 0.2–0.5 | 0 |

Note
(1) In the peel strength test after 3-day curing and also after thermal stress, break of the adhesion in every sample was cohesive failure within the adhesive layer.
(2) In the initial peel strength test and in the heat resistance test after 3-day curing and also after thermal stress, break of the adhesion in every sample was interface failure at the interface between the adhesive and steel sheet.

EXAMPLE 3

The steel sheet used in Example 1 (with application of the solid lubricant mentioned in Example 1) was press-formed into a curved shape and left as press-formed without being subjected to any degreasing or cleansing process.

A glass wool sheet formed of nonwoven filaments of glass fiber was stuck to the shaped steel sheet by using Cemedine 188, which was a polyvinyl acetate type adhesive in the form of paste containing organic solvent, manufactured by Cemedine Co. of Japan. Main properties of this adhesive were as follows.

| | |
|---|---|
| Consistency | about 300 |
| Solid Component | 53% |
| Density (20/4° C.) | 1.30 |
| Time for Set to Touch (20° C.) | 1–2 min |
| Setting Time (20° C.) | 3–4 hr |

This adhesive exhibited high chemical affinity with the solid lubricant retained on the steel sheet surface because of chemical affinity of polyvinyl acetate wit acrylic acid.

The strength of adhesion between the glass wool sheet and the steel sheet was examined by securing the steel sheet to a fixed frame and forcefully hammering the glass sheet until breakage of the glass wool sheet. As the result, the adhesive layer remained unbroken with the broken pieces of the glass wool sheet adhered thereto.

For separate samples, the peel strength was measured in the way as described in Example 1. Initially, the peel strength was greater than 2 kg but lower than 4 kg. After the humidity endurance test, the peel strength was lower than 2 kg. After the thermal stress test, the peel strength was also lower than 2 kg.

EXAMPLE 4

Referring to FIG. 3, a dash panel 30 as part of an automobile body was formed through blanking of a cold rolled steel sheet to which the solid lubricant mentioned in Example 1 had been applied beforehand in a quantity of 3–5 g per square meter of the steel sheet and press-forming of the blank. The dash panel 30 was left as press-formed without being subjected to any degreasing or cleansing process.

A rubber composition was prepared by using a medium-high-nitrile rubber (Hycar 1072 grade manufactured by Nippon Geon Co. of Japan. The following ingredients were added to 100 parts by weight of this nitrile rubber: 50 parts of hard clay, 35 parts of hydrated silica, 7 parts of chroman-indene resin, 5 parts of zinc oxide, 2 parts of sulfur, and 4.5 parts of other additives including stearic acid and paraffin. The rubber composition obtained through sufficient mastication and kneading of the resultant mixture was extruded to give an unvulcanized rubber sheet having a thickness of about 4 mm.

The chemical affinity of nitrile rubber with polar polymers such as PVC resin and modified phenolic resin becomes higher as the amount of acrylonitrile in the rubber is made larger. Hycar 1072 grade is a tripolymer rubber containing small amounts of acrylic acid and/or methacrylic acid as the third component copolymerizing with butadiene and acrylonitrile and, therefore, has carboxylic groups (one carboxylic group per 100–200 carbon atoms of acrylonitrile and butadiene). Besides the usual vulcanization with sulfur, this nitrile rubber can undergo cross-linking of its carboxylic groups with each other by the action of a suitable metal oxide typified by zinc oxide. This nitrile rubber has a high solubility parameter with a polar polymer such as modified phenolic resin and exhibits a good adhering ability.

For bonding of the unvulcanized rubber sheet cut into a desired shape and size, as indicated at 32 in FIG. 3, to the dash panel 30 as a damper for suppression of noise and vibration, an adhesive was prepared by well mixing the following ingredients.

| | |
|---|---|
| Nitrile rubber (Hicar 1072) | 6 parts (by weight) |
| Phenolic resin (Durez 12687) | 24 parts |
| Chroman-indene resin (Cumar P10) | 1.5 parts |
| Methylethyl ketone | 68.5 parts |

This adhesive was applied to the surface of the dash panel 30 (with the solid lubricant retained thereon) to a thickness of about 2–3 microns, and the dash panel 30 was left in this state for about 5 minutes to allow evaporation of the solvent contained in the adhesive. Then the unvulcanized nitrile rubber sheet 32 was placed on the adhesive-applied surface of the dash panel 30 and stuck thereto with application of a suitable pressure. The thus treated dash panel 30 was assembled with other press-formed parts of the automobile body by welding. The resultant automobile body was painted and then heated at 170° C. for 30 min to accomplish heat-fixing of the paint film. During this heating process, the rubber sheet 32 stuck to the dash panel 30 underwent thorough vulcanization.

The vulcanized nitrile rubber sheet 32 remained adhered to the dash panel 30 with sufficiently high adhesion strength, so that the rubber sheet 32 served as a durable damper for suppression of noise and vibration.

What is claimed is:

1. A method of producing an article having a structurally primary part formed of a metal sheet and a structurally secondary part adhered to the primary part with an adhesive, the method comprising the steps of:
    forming the primary part by press-forming of a metal sheet to which a lubricant is applied beforehand, said lubricant containing an organic polymeric substance as a principal component thereof;

applying an adhesive having a principal component which has a high chemical affinity for the principal component of said lubricant to a surface of the press-formed primary part with said lubricant being retained thereon, said adhesive being selected from the group consisting of a nitrile rubber, a polyurethane rubber and a vinyl polymer; and adhering the secondary part to the adhesive-applied surface of the primary part.

2. A method according to claim 1, wherein said organic polymeric substance is a polyacrylic acid.

3. A method according to claim 1, wherein said adhesive contains a synthetic rubber as a principal component thereof.

4. A method according to claim 1, wherein said secondary part is made of a synthetic resin.

5. A method according to claim 1, wherein said secondary part is made of a synthetic rubber.

6. A method according to claim 1, wherein said secondary part is made of a fibrous material.

7. A method according to claim 1, wherein said secondary part takes the form of a sheet.

8. A method according to claim 1, wherein said secondary part is made of a nonmetallic material.

9. A method of producing an article having a structurally primary part formed of a metal sheet and a structurally secondary part adhered to the primary part with an adhesive, said method comprising the steps of:

forming the primary part by press-forming of a metal sheet to which a solid lubricant containing polyacrylic acid as a principal component thereof is applied beforehand;

applying an adhesive containing a nitrile rubber as a principal component thereof, said nitrile rubber having a high chemical affinity with said polyacrylic acid of said lubricant, to a surface of the press-formed primary part with said polyacrylic acid lubricant being retained thereon; and adhering said secondary part to the adhesive-applied surface of said primary part.

10. A method of producing an article having a structurally primary part formed of a metal sheet and a structurally secondary part adhered to the primary part with an adhesive, said method comprising the steps of:

forming the primary part by press-forming of a metal sheet to which a solid lubricant containing polyacrylic acid as a principal component thereof is applied beforehand;

applying an adhesive containing a polyurethane rubber as a principal component thereof, said polyurethane rubber having a high chemical affinity with said polyacrylic acid of said lubricant, to a surface of the press-formed primary part with said polyacrylic acid lubricant being retained thereon; and adhering said secondary part to the adhesive-applied surface of said primary part.

11. A method of producing an article having a structurally primary part formed of a metal sheet and a structurally secondary part adhered to the primary part with an adhesive, said method comprising the steps of:

forming the primary part by press-forming of a metal sheet to which a solid lubricant containing polyacrylic acid as a principal component thereof is applied beforehand;

applying an adhesive containing a vinyl polymer as a principal component thereof, said vinyl polymer having a high chemical affinity with said polyacrylic acid of said lubricant, to a surface of the press-formed primary part with said polyacrylic acid lubricant being retained thereon; and adhering said secondary part to the adhesive-applied surface of said primary part.

* * * * *